Patented Sept. 19, 1944

2,358,324

UNITED STATES PATENT OFFICE 2,358,324

TREATMENT OF EGG SUBSTANCE AND RESULTING PRODUCT

Charles N. Frey, Scarsdale, and Glennard E. Miller, Bronx, N. Y., assignors to Standard Brands Incorporated, New York, N. Y., a corporation of Delaware No Drawing. Application August 30, 1939, Serial No. 292,606

21 Claims. (Cl. 99—210)

The invention relates to a process for the treatment of egg substance, and to a product resulting therefrom.

More particularly, it pertains to a processing of egg white and to a dried white, and includes correlated improvements and discoveries relating thereto.

An object of the invention is the provision of a procedure in accordance with which the drying of egg substance may be facilitated.

A further object of the invention is to provide a procedure whereby egg substance, particularly egg white, may be obtained in dry form with suppression of foaming during the drying operation.

An additional object of the invention is to provide a process for the manufacture of dried egg substance, particularly egg white, which may be readily, efficiently and economically carried out commercially.

A more particular object of the invention is the provision of a manner for processing egg whites wherein foaming during drying is markedly suppressed by the inclusion of an ester of a aliphatic monocarboxylic acid, especially a polyhydric alcohol ester.

Specific objects of the invention are to provide a process for the production of dried egg white, which entails inclusion of a lauric acid ester and a proteolytic enzyme and, as a composition of matter, a dried egg white containing a fatty acid ester which may be in conjunction with a proteolytic enzyme.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

The drying of egg substance may be accomplished in the practice of the invention by incorporating an ester of a fatty acid, more particularly a polyhydric alcohol ester of an aliphatic monocarboxylic acid with the egg substance, and then drying.

It is desirable also to include a proteolytic enzyme and in certain instances, as in the treatment of yolks or whole eggs, inclusion of the enzyme alone leads to a definite facilitation of the drying procedure. A rotary type of vacuum drug dryer has given satisfactory results, but other forms of drying may be utilized.

The ester of the fatty acid may be a simple one, as exemplified by the formula $RCOOX$, wherein $R$ represents a saturated alkyl radical and $X$ either a saturated or unsaturated hydrocarbon radical, specifically propylene laurate of the formula $C_{11}H_{23}COOC_3H_5$. Further, the ester may be the reaction product between a polyhydric alcohol, for example, glycerol, erythrol, mannitol and sorbitol, and a higher molecular weight fatty acid, which may be lauric, palmitic, stearic or oleic.

The inclusion of a proteolytic enzyme brings about a thinning of the egg substance, specifically, the white, so that the following filtering to remove any lumps or stringy substance, the whites may be more uniformly distributed over the drying surface, and utilization may be made of papain, trypsin, or bromelin. Moreover, the amount of the ester which may be added may be upwards to about 0.1% based upon the original weight of the egg substance. Preferably, about 0.01% is utilized and the addition of proteolytic enzyme may be in an amount of from 0.022% to 0.044%. While the treatment is ordinarily carried out at room temperatures, nevertheless a higher working temperature may be employed with attending decrease in time of treatment. It is to be borne in mind, however, that the temperature should not be sufficiently high to occasion a coagulation of the egg substance. A decrease in whipping property has been noted when larger amounts of the esters are employed. Hence, if the whipping properties are to be retained a smaller amount should be incorporated, whereas if such property is not a consideration, a larger amount may be included, whereby the drying time will be shortened, as shown by the quantity of egg substance that can be treated in given period. The incorporation or inclusion of the ester and also of the proteolytic enzyme with the egg substance while in liquid state and prior to drying leads, of course, to obtainment of a composition, as egg white, having the ester and/or proteolytic enzyme within the albumen of the white, i. e., an intra-albumen content.

As an illustrative embodiment of a manner in which the invention may be practiced, the following examples are presented:

*Example I*

With 10 lbs. of egg white there is incorporated about 1 gram of a good strength papain. When the white has become thin it is filtered to remove all stringy material, and following addition of sorbitol laurate, having the probable formula $CH_2OH(CHOH)_4CH_2OOCC_{11}H_{23}$, in an amount of about 0.1% the mass is fed to a vacuum drum type of dryer. The thinning of the white by means of papain conditions it so that a uniform feeding to the rolls of the dryer may be effected, and the treatment with sorbitol laurate suffices to suppress foaming whereby it was found that the egg white could be fed to the rolls at a rate of 112 oz. per hour. Removal of the dried white is effected by a suitable scraping blade, and is obtained as a flaky product which dissolves fairly well in water. When smaller amounts of sorbitol laurate were included, the following drying rates were obtained:

| Percentage | Ounces per hour |
|---|---|
| 0.02 | 131 |
| 0.01 | 164 |
| 0.005 | 139 |

When thin whites were dried without the addition of sorbitol laurate there was a marked foaming of the mass, and such that only 44 oz. could be dried per hour.

*Example II*

Egg white may be thinned in the manner set forth in Example I, and glycerol mono laurate having the probable formula $$CH_2OH.CHOH.CH_2OOCC_{11}H_{23}$$

incorporated to the extent of 0.01%. The mass was then dried, and with a rate of 68 oz. per hour.

*Example III*

Whites may be thinned by incorporation of trypsin in an amount of 1 gram for each 10 lbs. of white, and the mass filtered in any suitable manner, as passage through screens to remove stringy material. Mannitol laurate, having the probable formula $$C_{11}H_{23}COOCH_2(CHOH)_4CH_2OH$$

may then be introduced in an amount of 0.01% and the drying of the white effected by means of a drum dryer. It was found that the whites so treated could be dried at a rate of 102.4 oz. per hour. A similar carrying out of the process, but with the inclusion of 0.005% mannitol laurate afforded a drying at a rate of 96 oz. per hour.

*Example IV*

Egg white thinned with papain as in Example I and filtered may have incorporated therewith 0.01% mannitol laurate and 3% sucrose. The mass was then dried upon a drum dryer, the rate being 87.3 oz. per hour, and the product obtained was partially flaky.

*Example V*

Frozen whole eggs were thinned by incorporation of papain and then dried upon a drum dryer. The rate of drying was 93.5 oz. of egg substance per hour, and it was found that the product dried well, giving a loose, flaky material which mixes and dissolves readily with water.

*Example VI*

Fresh egg yolk was treated with papain as in Example V and then dried. The rate of drying was about 128 oz. per hour, and the product obtained was a loose, flaky material which mixes and dissolves readily with water.

*Example VII*

Frozen sugar yolks were treated with papain as in Example V, whereby they were thinned, and then dried. The drying was effected at the rate of 147 oz. per hour, with obtainment of a loose, flaky product which is readily taken up by water.

*Example VIII*

Egg white was thinned with papain and filtered in the manner given in Example I. To this material there was added 0.01% of propylene laurate, having the probable formula $$C_{11}H_{23}COOC_3H_5$$

and the mass dried by introduction upon the rolls of a drum dryer. The mass dried well at a rate of about 102 oz. per hour, and gave a loose, flaky product which dissolved readily in water.

The treatments of egg substance, as described above, lead to a thinning thereof due to the action of the proteolytic enzyme, for example, papain, trypsin or bromelin, which permits, following removal of the stringy material, the feeding of the mass to drying rolls in a uniform manner so that drying is materially facilitated, as evidenced by the distinctly increased rate of drying. The addition of a fatty acid ester, as those above mentioned, especially the polyhydric alcohol esters of high molecular weight aliphatic monocarboxylic acids, specifically, laurates and oleates of glycerol, sorbitol and mannitol, affords a manner in which the foaming which attends the drying of whites is suppressed to such an extent that there is not material hindrance during drying. The product obtained is in the form of a loose, flaky mass, which may be readily taken up in water.

Furthermore, the properties of the egg substance are not altered so that the dried material may be used in the manners and for the purposes usually attending dried egg substance. Moreover, the dried egg white may be whipped in the usual manner, and the whipping properties are not affected when lower concentrations of the ester are used. However, if, for example, 0.1% of sorbitol laurate is included, the whipping property of the white is practically lost. Hence, when the material is to be whipped, only a small amount of ester should be included, but when the whipping property may be disregarded, larger amounts may be incorporated. The effect upon whipping property is shown by the following:

One lb. each of original white treated with papain only; of original white treated with papain and containing 0.01% sorbitol laurate, and of dry white containing papain and sorbitol laurate, made up 65 grams to 1 lb., was whipped for five minutes. All of these materials reached about the same consistency, but the volumes of the sorbitol-treated white were somewhat less than the white treated merely with papain. Moreover, the sorbitol laurate materials were slightly slower in starting to whip, but good volumes were obtained. All three of the whips broke down at substantially the same rate. A like procedure with inclusion of 0.005% sorbitol laurate gave similar results upon whipping.

In accordance with the foregoing procedures egg substance may be dried at a decidedly increased rate, with an even flow of the substance upon the drying surface, with suppression of foaming and obtainment of the substance from the drying surface in the form of a fine, granular powder, or as a loose, flaky product.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process for drying egg substance, which comprises incorporating a substance which is solely an incompletely esterified reaction product of an unesterified polyhydric alcohol and an aliphatic monocarboxylic acid with egg substance, and drying.

2. A process for drying egg substance, which comprises incorporating a substance which is solely an incompletely esterified reaction product of an unesterified polyhydric alcohol and an aliphatic monocarboxylic acid and a proteolytic enzyme with egg substance, and drying.

3. A process for drying egg whites, which comprises incorporating a substance which is solely an incompletely esterified reaction product of an unesterified polyhydric alcohol and an aliphatic monocarboxylic acid with egg whites, and drying.

4. A process for drying egg whites, which comprises incorporating a substance which is solely an incompletely esterified reaction product of an unesterified polyhydric alcohol and lauric acid with egg whites, and drying.

5. A process for drying egg whites, which comprises incorporating a substance which is solely an incompletely esterified reaction product of an unesterified hexahydric alcohol and lauric acid with egg whites, and drying.

6. A process for drying egg whites, which comprises incorporating a substance which is solely an incompletely esterified reaction product of an unesterified glycerol and lauric acid with egg whites, and drying.

7. A process for drying egg whites, which comprises incorporating a substance which is solely an incompletely esterified reaction product of unesterified sorbitol and lauric acid with egg whites, and drying.

8. A process for drying egg whites, which comprises incorporating a substance which is solely an incompletely esterified reaction product of an unesterified polyhydric alcohol and an aliphatic monocarboxylic acid and a proteolytic enzyme with egg whites, and drying.

9. A process for drying egg whites, which comprises incorporating a substance which is solely an incompletely esterified reaction product of an unesterified polyhydric alcohol and an aliphatic monocarboxylic acid and papain with egg whites, and drying.

10. A process for drying egg whites, which comprises incorporating a substance which is solely an incompletely esterified reaction product of unesterified sorbitol and lauric acid and papain with egg whites, and drying.

11. A process for drying egg whites, which comprises incorporating upwards to 0.1% of a substance which is solely an incompletely esterified reaction product of unesterified sorbitol and lauric acid and from about 0.022 to 0.044% papain with egg whites, such percentages being based on the original weight of the whites, and drying.

12. A dried egg substance having an intra-albumen content of a substance which is solely an incompletely esterified reaction product of an unesterified polyhydric alcohol and an aliphatic monocarboxylic acid, and a proteolytic enzyme.

13. A dried egg white having an intra-albumen content of a substance which is solely an incompletely esterified reaction product of an unesterified polyhydric alcohol and an aliphatic monocarboxylic acid, and produced by incorporating said reaction product with egg white, and then drying.

14. A process for drying egg substance which comprises incorporating a substance which is solely an incompletely esterified reaction product of an unesterified polyhydric alcohol and lauric acid with egg substance, and drying.

15. As a composition of matter, dried egg substance having an intra-albumen content of a substance which is solely an incompletely esterified reaction product of an unesterified polyhydric alcohol, and lauric acid.

16. As a composition of matter dried egg whites having an intra-albumen content of a substance which is solely an incompletely esterified reaction product of an unesterified polyhydric alcohol and an aliphatic monocarboxylic acid, and a proteolytic enzyme.

17. As a composition of matter dried egg whites having an intra-albumen content of a substance which is solely an incompletely esterified reaction product of an unesterified polyhydric alcohol and an aliphatic monocarboxylic acid, and papain.

18. As a composition of matter dried egg whites having an intra-albumen content of a substance which is solely an incompletely esterified reaction product of an unesterified polyhydric alcohol and lauric acid.

19. As a composition of matter dried egg whites having an intra-albumen content of a substance which is solely an incompletely esterified reaction product of an unesterified hexahydric alcohol, and lauric acid.

20. As a composition of matter dried egg whites having an intra-albumen content of a substance which is solely an incompletely esterified reaction product of unesterified sorbitol and lauric acid.

21. As a composition of matter dried egg whites having an intra-albumen content of a substance which is solely an incompletely esterified reaction product of unesterified glycerol and lauric acid.

CHARLES N. FREY.
GLENNARD E. MILLER.

CERTIFICATE OF CORRECTION.

Patent No. 2,358,324. September 19, 1944.

CHARLES N. FREY, ET AL.

It is hereby certified that error appears in the printed specification of the above numbered patent requiring correction as follows: Page 1, second column, line 1, for the word "drug" read --drum--; line 16, before "following" strike out "the"; line 40, for "treated in" read --treated in a--; page 2, first column, line 12, after "and" insert --it--; and that the said Letters Patent should be read with this correction therein that the same may conform to the record of the case in the Patent Office.

Signed and sealed this 14th day of November, A. D. 1944.

Leslie Frazer (Seal)  Acting Commissioner of Patents.